United States Patent [19]

Yamaguchi et al.

[11] 4,410,502

[45] Oct. 18, 1983

[54] METHOD FOR MANUFACTURE OF SILICON CARBIDE

[75] Inventors: Masami Yamaguchi, Tokorozawa; Toshiyuki Nakazima, Yokohama; Yoshiro Tajitsu; Yoshiharu Kitahama, both of Kawasaki; Isamu Iwami, Zushi, all of Japan

[73] Assignee: Asahi-Dow Limited, Tokyo, Japan

[21] Appl. No.: 321,258

[22] Filed: Nov. 13, 1981

[30] Foreign Application Priority Data

Nov. 13, 1980 [JP] Japan ................ 55-159856

[51] Int. Cl.$^3$ .............................................. C01B 31/36
[52] U.S. Cl. ................................................... 423/345
[58] Field of Search ........................... 423/345; 501/88

[56] References Cited

U.S. PATENT DOCUMENTS 3,085,863  4/1963  Prener ................... 423/345
3,379,647  4/1968  Smudski ............... 423/345 X

FOREIGN PATENT DOCUMENTS 1565919  5/1969  France .
1099647  3/1969  United Kingdom .

Primary Examiner—Jack Cooper
Attorney, Agent, or Firm—Armstrong, Nikaido, Marmelstein & Kubovcik

[57] ABSTRACT

Silicon carbide of improved quality is obtained by using a liquid silicic acid or modified liquid silicic acid as a silicic substance and carbon in a powdered form, a precursor of carbon in a powdered form, or a precursor of carbon in the form of a solution as a carbonaceous substance, and thermally treating these raw materials in a non-oxidative atmosphere. The silicon carbide thus produced is finely divided and in high-purity and suitable for use as raw material for the production of high-strength sintered articles.

9 Claims, No Drawings

METHOD FOR MANUFACTURE OF SILICON CARBIDE

BACKGROUND OF THE INVENTION

This invention relates to a method for the manufacture of silicon carbide and more particularly to a method for the manufacture of finely divided high-purity silicon carbide suitable for use as a raw material for the production of high-strength sintered articles of silicon carbide.

Silicon carbide has excellent thermal resistance and high-temperature strength. Silicon carbide in a sintered form, therefore, is expected to find utility in various high-temperature structural members such as high-temperature gas turbines, for example. The thermal and mechanical properties of the sintered articles of silicon carbide depend heavily on the attributes of silicon carbide powder, the raw material for the sintered articles. To achieve the optimum effect, silicon carbide powder is desired to be of high-purity possessing as small a particle diameter as possible and not to suffer from dispersion of particle shape and size. Among the methods developed and adopted to date for the synthesis of silicon carbide, those widely known in the art are:

(i) reaction of metallic silicon and carbon,
(ii) reaction of silicon tetrachloride, hydrogen and carbon,
(iii) reaction of silica ($SiO_2$) and carbon.

Of these methods, the method (iii) enjoys a number of commercial advantages such as low cost of raw materials used, simplicity and ease of reactions and attendant operations involved in the synthesis, and freedom from use of raw materials capable of corroding the equipment in use. However, it is difficult to obtain fine powder of silicon carbide by the method of (iii).

Several improved versions of the method of (iii) have been proposed with a view to materializing production of finely divided silicon carbide. One trend of these improved versions is toward using a finely divided carbon powder and a finely divided $SiO_2$ powder as the raw materials thereby producing finely divided silicon carbide powder. Generally in a raw material obtained by mixing different solid powders, the homogeneity of mixture and the intimacy of contact between the powders have their limits. In the present case, therefore, part of the $SiO_2$ tends to remain in reaction products, frequently making it necessary to remove the $SiO_2$ with hydrofluoric acid. Even when there is used a $SiO_2$ powder having a very small particle diameter of $0.01\mu$, for example, the produced silicon carbide powder has a particle soze on the order of $0.6\mu$ (Japanese Unexamined Patent Publication No. 126699/1979).

In one known method, colloidal silica which has silica particles colloidally suspended in water is used as the $SiO_2$. Japanese Patent Publication No. 34028/1970 (corresponding to British Pat. No. 1,099,647) cites quartz, sand, silicic acid, silica gel, amorphous silica, colloidal silica, and many others as examples of the $SiO_2$ source but makes no mention whatever about the advantage derivable from the use of colloidal silica.

Hase and Suzuki, Journal of Ceramics Society of Japan, 86, 541 (1978) reports an observation that SiC found by X-ray analysis to possess an apparent crystallite size of 530 to 600 A was obtained by using colloidal silica. Also in this case, the product was treated with hydrofluoric acid. The particle size of the SiC by SEM is mentioned nowhere in this report.

Colloidal silica is a colloidal solution having a milky white color. When it is mixed with a solid carbon source, the homogeneity of mixture is higher than when $SiO_2$ powder is mixed with a solid carbon source. The higher homogeneity of mixture is thought to have a better effect upon the reaction for the formation of SiC. No such observation is mentioned anywhere in the literature cited above.

The absence of such better effect may possibly be ascribed to the large size of individual silica particles in the colloidal silica. Even if the expected better effect is obtained at all, since the colloidal silica contains sodium or some other alkali metal compound as a stabilizer, it does not prove advantageous as a raw material for the production of silicon carbide powder of high purity.

SUMMARY OF THE INVENTION

An object of this invention is to provide a method for the manufacture of silicon carbide powder, and more particularly a novel method for the manufacture of finely divided, high-purity silicon carbide powder suitable as a raw material for the production of high-strength sintered articles of silicon carbide.

This invention relates to an improved method for the manufacture of silicon carbide by the thermal treatment of a silicic substance and a carbonaceous substance in a nonoxidative atmosphere. The improvement comprises using as the silicic substance either liquid silicic acid or modified liquid silicic acid and as the carbonaceous substance carbon in a powdered form, a precursor of carbon in a powdered form, or a precursor of carbon in the form of a solution.

DETAILED DESCRIPTION OF THE INVENTION

This invention is based on a new discovery that in the method of (iii) which obtains silicon carbide by heating a carbonaceous substance and a silicic substance in a non-oxidative atmosphere, when silicic acid in a liquid form is used as the silicic substance in the place of solid silica heretofore used for the purpose, silicon carbide having a very small particle diameter is produced with ease.

As compared with the conventional method which mixes a solid carbon, the present invention uses silicic acid in a liquid form instead of the solid silica. Consequently, the contact and mixture of the carbonaceous substance and the silicic substance are obtained with homogeneity. This advantageous effect may be ascribed to fine powder of the two components and to uniform and intimate mixture of the finely divided components.

Now, the present invention will be described in detail below. The term "silicic acid" as used in this specification means $Si(OH)_4$ or a dehydration condensation product thereof. Silicic acid can be easily prepared by any of various methods known to the art. For example, it is readily produced by a method which uses an alkali silicate as the raw material and dealkalizes this compound by subjecting an aqueous solution of the compound to acid decomposition, electrolytic dialysis, or ion exchange. Another method uses a hydrolyzable silicon compound such as a silicon halogenide of a silicic ester, for example ethyl silicate as the raw material and subjects this raw material to hydrolysis. The method which uses an alkali silicate as the raw material, among other methods, proves to be advantageous from the economic point of view.

The term "liquid silicic acid" as used in this specification means a clear solution and/or sol of silicic acid. The term "clear" as used herein means the clarity of the liquid silicic acid mentioned above, such that when this liquid silicic acid prepared in a 5% $SiO_2$ concentration is tested in a spectrophotometer using a wavelength of 420 m$\mu$ and a cell length of 1 cm, the transmittance of light is 80% or over relative to distilled water.

For use in this invention, such an opaque liquid as colloidal silica is undesirable because the silica particles have grown to a very large size.

In one aspect of this invention, the liquid silicic acid is obtained by dealkalizing an aqueous alkali silicate solution with an ion-exchange resin. This method does not need the troublesome treatment, namely the addition of an alkali metal compound, for the growth and stabilization of silica particles as inevitably involved in the production of colloidal silica.

Although water is generally used as the solvent or dispersant in the liquid silicic acid, an organic solvent or a mixture of an organic solvent with water may be used instead. A solvent or dispersant suitable for a particular occasion is selected taking into due account the type of the raw material for silicic acid and the method used for the production of silicic acid. For example, water is preferable when the silicic acid is produced by the dealkalization of an alkali silicate by use of an ion-exchange resin, whereas a water-organic solvent system is preferable when the silicic acid is obtained by the hydrolysis of a silicic ester. The organic solvent is desired to be a polar organic solvent which exhibits high miscibility to silicic acid. Examples of organic solvents which meet this requirement include alcohols, ketones, esters, organic acids, halogenated hydrocarbons, amides, and sulfoxides. Other organic solvents may be mingled, providing that they do not cause precipitation of silicic acid.

The term "modified liquid silicic acid" as used in this specification means a solution of silicic acid or a sol containing at least one member selected from the group consisting of ammonium ion, organic amine, and quaternary ammonium ion. The modified liquid silicic acid exhibits higher stability and yields to gelation with greater resistance than the liquid silicic acid and, therefore, enjoys an advantage that it can be handled and stored with ease. The modified liquid silicic acid to be used in this invention can be easily produced by any of various methods known to the art. Among these methods, the method which involves treatment of the aqueous solution of an alkali silicate with an ion-exchange resin incorporating ammonium ion, organic amine, or quaternary ammonium ion proves to be particularly advantageous from the commercial point of view. In the liquid silicic acid or modified liquid silicic acid, the concentration of silicic acid calculated as $SiO_2$ is generally not more than 50%, preferably not more than 20%, and more preferably not more than 15%. When the concentration is higher, the liquid silicic acid tends to undergo gelation. Once the liquid silicic acid forms a gel, it can no longer uniformly contact the carbonaceous substance.

Although the lower limit of the concentration of silicic acid is determined by reason of economy it is generally to be not less than 0.5% by weight, preferably not less than 1% by weight, and more preferably not less than 4% by weight.

From the economic point of view, the amount of the modifying agent such as ammonium ion to be contained in the modified liquid silicic acid is generally to be not more than 4 mols, preferably not more than 2 mols, per mol of Si in the silicic acid. If the modifying agent is present in a greater amount, however, no technical difficulty is entailed.

As the carbonaceous substance, carbon in a powdered form, a precursor of carbon in a powdered form, or a precursor of carbon in the form of a solution can be used. By combining such a carbonaceous substance and a liquid silicic acid or a modified liquid silicic acid, there can be easily obtained silicon carbide of high grade.

Carbon black, activated carbon, etc. are typical examples of the carbon in a powdery form.

The term "precursor of carbon" as used in this specification means a substance which produces carbon at elevated temperatures, namely, an organic substance which converts into a carbonaceous residue when it is heated to a temperature falling within the range of from 200° to 1500° C. at least in a nonoxidative atmosphere. Such a precursor of carbon can be suitably selected from among carbohydrates and their derivatives. Concrete examples of carbohydrates and their derivatives include polysaccharides such as starch, cellulose, hemicellulose, hydroxyethyl cellulose, alginic acid, pectin, natural gum, dextrin, and dextran, derivatives thereof, and hydrolyzates thereof, oligosaccharides and monosaccharides such as sucrose, maltose, and glucose, and derivatives thereof. Other examples of precursors of carbon include protein substances such as gluten and casein and derivatives thereof, vinyl polymers such as polyvinyl alcohol, polyacrylonitrile, polyvinyl chloride, polyvinylidene chloride, polyvinyl acetate, polybutadiene, and copolymers preponderantly formed thereof, and derivatives of such vinyl polymers, thermosetting resins such as phenol resin and urea resin, petroleum pitch, and many others.

The precursor of carbon may be in a powdered form or in the form of a solution, preferably in the latter form. When the precursor of carbon is in the form of textile or film, the produced silicon carbide tends to aggregate in the form of textile or film. Thus, use of the precursor of carbon in this form is undesirable. Only the silicon carbide obtained in this form may be broken elaborately into a finely divided form.

The expression "a precursor of carbon in the form of a solution" as used in this application means a precursor of carbon in the form of a solution or sol wherein the precursor of carbon exists as a solute or dispersoid. The precursor of carbon which particularly suits the present invention is a precursor of carbon which can be converted advantageously into a solution or sol. Preferred examples of the precursor of carbon answering this description are monosaccharides, oligosaccharides, polysaccharides, vinyl polymers and derivatives thereof.

The effective concentration of the precursor of carbon in its solution covers a wide range. At a high concentration, however, the precursor assumes too high viscosity to permit ready handling. At a low concentration, the precursor does not prove economical as a raw material. Thus, the concentration of the precursor is generally required to fall in the range of from 0.1 to 80% by weight, preferably from 0.5 to 60% by weight, and more preferably from 1 to 50% by weight.

The solvent or dispersant to be used in the precursor of carbon in the form of a solution is only required to suit the particular precursor of carbon involved. Preferably, the solvent or dispersant possesses high affinity for the silicic acid. Examples are water and polar organic solvents such as alcohols, ketones, esters, organic acids, amides, and sulfoxides. Among the solvents, water is a preferred choice.

The ratio of the carbon or precursor of carbon to the liquid silicic acid or modified liquid silicic acid is generally to fall in the range of from 0.3 to 5 parts by weight, preferably from 0.6 to 2 parts by weight, of the carbon or the carbon content of the precursor of carbon per 1 part by weight of the silicic acid content, calculated as $SiO_2$, of the liquid silicic acid or modified liquid silicic acid. When the content of C is smaller than the lower limit of the range mentioned above, the produced silicon carbide has a tendency to contain unaltered $SiO_2$ as impurities. When the content of C is larger than the upper limit of the range, the economy of the production is impaired, although no technical inconvenience is entailed.

The carbonaceous substance and the liquid silicic acid or modified liquid silicic acid are brought into mutual contact in the proportion mentioned above. This mutual contact can be accomplished by any of various known methods such as, for example, immersion, impregnation, spraying, coating, kneading, and mixing. For the convenience of the removal of impurities, the mutual contact of the carbonaceous substance and the liquid silicic acid or modified liquid silicic acid is desired to be effected by using a liquid silicic acid prepared in advance in a separate system rather than by allowing a silicic acid to be formed in a system in which the carbonaceous substance has been incorporated in advance. To be more specific, the contact may be accomplished by having carbon or a precursor of carbon in a powdered form retained in a fluidized state and spraying silicic acid onto the fluidized carbon particles or by adding carbon or a precursor of carbon in a powdered form to the liquid silicic acid and stirring the mixture with a high-speed mixer, for example.

Otherwise, the contact may be effected by mixing a liquid silicic acid with the precursor of carbon in the form of a solution of sol or by adding the precursor of carbon to the liquid silicic acid, dissolving the precursor of carbon and intimately blending the two substances.

The essential requirement in this respect is that carbon or the precursor of carbon and the liquid silicic acid or modified liquid silicic acid are mixed thoroughly into a homogeneous state. In this case, it suffices for the purpose of this invention that the two raw materials are homogeneously mixed with each other. This mixing does not need to produce any chemical reaction at this stage. However, any chemical reaction taking place may be tolerated providing that this chemical reaction does not impair the uniformity of the system. Once the two substances have been brought into a homogeneously mixed liquid state, it does not matter at all whether the entire system undergoes gelation or not.

The mixed system of the two substances may incorporate a third component capable of accelerating reaction, improving the product quality, or enhancing the sintering property, on condition that the added third component will not impair the homogeneity of the mixed system. For example, a surface active agent may be added to the system for the purpose of ensuring smooth mixing of the two substances.

The mixture thus obtained is subjected to a reaction after undergoing, or not undergoing, a pretreatment for drying or solidification. Since the reaction proceeds at elevated temperatures, a mixture which has a low water content can be subjected directly to this reaction without undergoing the treatment for drying in advance. When the mixture has to go through a pretreatment for drying, any of various methods of drying of popular use can be adopted. Examples are drying in air, drying by heat application, drying in hot air, drying under a vacuum, drying by spraying, and drying by freezing. The drying is desired to proceed uniformly throughout. Spray drying proves particularly desirable, because the mixture is uniformly dried so that the produced silicon carbide has a very small particle diameter.

Optionally, the homogeneous mixture of carbon or the precursor of carbon with the liquid silicic acid or modified liquid silicic acid may be left standing to permit the silicic acid or modified silicic acid to precipitate therein before the mixture is subjected to the reaction. This precipitation can be accomplished by any of the various known methods for the precipitation of silicic acid such as, for example, a method involving adjustment of the pH value in the presence of an inorganic salt such as $NH_4Cl$ or $NH_4NO_3$, a method involving adjustment of the pH value in the presence of a surfactant, and a method involving admixture in a non-solvent. The method which involves adjustment of the pH value in the presence of a surfactant is particularly advantageous from the practical point of view because it is not required to use an expensive non-solvent or a large amount of inorganic salt. Combined use of a surfactant and an inorganic salt is permissible of course.

The reaction for the formation of silicon carbide can be carried out by any of the ordinary methods available for the purpose. To be specific, it can be performed by heating the mixture in a non-oxidative atmosphere such as, for example, an atmosphere of nitrogen, carbon monoxide, argon, ammonia, hydrogen, or helium at temperatures of 1350° to 1850° C. (over 1550° C. where nitrogen or ammonia is used), preferably 1400° to 1700° C. When the reaction temperature is less than 1350° C., the reaction does not proceed smoothly. When it exceeds 1850° C., the particles of the mixture are suffered to grow. Any deviation from the range mentioned above, therefore, is undesirable. When the non-oxidative atmosphere is formed of nitrogen or ammonia, the lower limit of 1550° C. must be strictly observed, for silicon nitride is suffered to grow at temperatures below 1550° C.

The particle diameter of the produced silicon carbide is variable to some extent with the kind of the carbon source used and the method of drying adopted. Generally, however, the produced silicon carbide is in the form of fine particles having a diameter on the order of submicron, in the range of 0.1 to $0.4\mu$.

The apparent crystallite size of the produced silicon carbide as determined by the X-ray analysis is generally below 200Å, in the range of 70 to 200Å.

The advantages derivable from the present invention are as follows.

In the case of conventional method which starts from powdered silica and powdered carbon, because of the solid-phase mixing involved therein, the resultant mixture is not obtained in a homogeneous state and consequently the reaction does not proceed uniformly. At times, the reaction is observed to suffer from heavy occurrence of unaltered raw materials, formation of by-products, and ununiform distribution of crystalline phase. By contrast, in the case of the method of this invention, because of the liquid-phase mixing involved, the resultant mixture is retained in high homogeneity, so that the various drawbacks mentioned above do not readily occur. Thus, the method gives rise to a finely divided product sparingly suffering from dispersion of particle shape and size. When the product of the reaction is spray dried, it can be finished in a powdered form having an extremely small particle diameter in the neighborhood of $0.1\mu$. Thus, the method of this invention is decisively advantageous over the conventional method, As another advantage of the method of this invention, there may be cited the fact that since the starting materials are not solid but liquid, the removal of harmful impurities entrained by the starting materials can be easily effected by filtration or ion exchange to ensure production of silicon carbide of high purity.

Now, the invention will be described more specifically below with reference to working examples.

The crystalline phases of silicon carbide formed in the following working examples were determined by the X-ray diffraction (Cu-K$\alpha$, $2\theta$) pattern in accordance with the method proposed by Hase et al. [Journal of Ceramics Society of Japan, 87, 576 (1979)].

EXAMPLE 1

Sixty (60) g of a dilute aqueous solution of (concentration: 8% by weight as $SiO_2$) water glass No. 3 (JIS K1408-66) was passed at a flow rate of 4.5 ml/min. through a column (a glass column measuring 1 cm in diameter and 90 cm in length and provided with a cooling jacket) packed with 60 ml of a cation-exchange resin, Amberlite 200C (H+ form), for removal of sodium. Consequently, there was obtained an aqueous silicic acid solution ($SiO_2$ content 5% by weight). This solution had a sodium content of 0.02% as $Na/SiO_2$, a transmittance of light (at 429 m$\mu$, with 1-cm cell) was 94%.

In a homogenizer, 90 g of the resultant aqueous silicic acid solution and 4.5 g of carbon black were treated for 15 minutes. The resultant mixture was spray dried to afford a silicic acid/carbon black mixture. This mixture was heated in an atmosphere of helium at 1440° C. for four hours to afford silicon carbide. The product was a finely divided powder having uniform particle shape and size. The particle diameter was about $0.1\mu$. The crystalline phase was composed of 90% of 3C and 10% of 2H. The apparent crystallite size of the product as measured by the X-ray analysis was 170 Å. No residual $SiO_2$ could be detected in the product by X-ray diffractometry.

Comparative Experiment 1

The procedure of Example 1 was faithfully repeated, except that a suspension of silica powder (prepared by adding 4.5 g of silica powder to 90 ml of water and stirring them in a homogenizer) was used in the place of the aqueous silic acid solution. The product obtained lacked homogeneity. Even the smallest particles measured more than $0.5\mu$ in diameter. Solid particles measuring about 40 microns were detected in the product. The product was found by X-ray diffractometry to contain residual $SiO_2$ in the form of cristobalite.

EXAMPLE 2

In a mixer, 20 g of the same aqueous silicic acid solution (SiO content 5% by weight) as used in Example 1 and 71 g of carbon black washed in advance with acetone were mixed for 10 minutes. The resultant mixture was vacuum dried at 60° C.

By subjecting the resultant mixture to the reaction as in Example 1, there was obtained silicon carbide. The particle diameter was in the range of 0.2 to $0.3\mu$. The crystalline phase was composed of 86% of 3C and 14% of 2H. No residual SiO could be detected in the product by X-ray diffractiometry.

COMPARATIVE EXPERIMENT 2

The procedure of Example 2 was repeated, except that colloidal silica (made by Nissan Chemical and marketed under trademark designation of Snowtex 30) was used in a $SiO_2$ concentration of 5% in the place of the aqueous silicic acid solution. The transmittance of light (at 420 m$\mu$, and 1-cm cell) was 56%.

By the same treatment as in Example 2, there was obtained silicon carbide. The particle diameter was in the range of 0.3 to $0.4\mu$. This product was found by X-ray diffractiometry to contain residual $SiO_2$ in the form of cristobalite.

EXAMPLE 3

In 1.5 liters of a 1% solution of nonionic surfactant (made by Nippon Oils and Fats, and marketed under trademark designation of NS208.5) 100 g of carbon black was stirred for one hour. From the resultant mixture, a portion equivalent to 1.5 g of carbon black was taken and added to 30 g of the same aqueous silicic acid solution ($SiO_2$ content 5% by weight) as used in Example 1. The mixture was stirred for 10 minutes in a mixer and then dried by heating at 110° C.

By subjecting the mixture to the same treatment as used in Example 1, there was obtained silicon carbide having a particle diameter in the range of 0.1 to $0.2\mu$. The crystalline phase was composed of 81% of 3C and 19% of 2H. No residual $SiO_2$ could be detected in the product by X-ray diffractometry.

EXAMPLE 4

Twenty (20) g of the same liquid silicic acid as used in Example 1 was allowed to impregnate 5 g of carbon black washed in advance with acetone. The wet carbon black was vacuum dried at 60° C. After the drying, the carbon black was again impregnated with 20 g of liquid silicic acid and then vacuum dried at 60° C. This treatment was further repeated three times to have the carbon black treated with a total of 100 g of liquid silicic acid. Thus was obtained a silicic acid/carbon black mixture. This mixture was heated in an atmosphere of argon at 1440° C. for four hours. Consequently, there was obtained a finely divided silicon carbide powder having a particle diameter in the range of 0.2 to $0.3\mu$. The crystalline phase was composed of 91% of 3C and 9% of 2H.

EXAMPLE 5

In 75 ml of ethanol, 21 g of ethyl silicate was added and then 7.2 ml of an aqueous 3% hydrochloric acid solution was added thereto to induce hydrolysis at 25° C. From the resultant liquid silicic acid, a 50-ml portion was taken and sprayed in several fractions onto 6 g of carbon black. Thus was obtained a silicic acid/carbon black mixture. This mixture was heated in an atmosphere of helium at 1480° C. for six hours, to afford silicon carbide. The product had a particle diameter in the range of 0.2 to $0.3\mu$. The crystalline phase was composed of 88% of 3C and 12% of 2H.

EXAMPLE 6

Twenty (20) g of an aqueous dextran solution (dextran content 4 g) was mixed with 24 g of the same liquid silicic acid as used in Example 1. The resultant mixture was spray dried. The white powder thus obtained was heated in an atmosphere of helium at 1440° C. for four hours. The resultant product was lightly pulverized to afford silicon carbide powder having a particle diameter in the range of 0.1 to 0.2μ. The crystalline phase was composed of 90% of 3C and 10% of 2H.

EXAMPLE 7

An aqueous solution containing sucrose and sodium metasilicate (sucrose content 20% and $SiO_2$ cntent 5%) was passed through a column packed with a cation-exchange resin, Amberlite 200C (H+ form), to effect removal of sodium. There was obtained an aqueous silicic acid/sucrose solution (sucrose content 19% and $SiO_2$ content 4.5%). Twenty (20) g of this solution was spray dried and then heated in an atmosphere of helium at 1440° C. for four hours. Consequently, there was obtained silicon carbide powder having a particle diameter of about 1μ. The crystalline phase was composed of 93% of 3C and 7% of 2H.

EXAMPLE 8

A dilute aqueous solution ($SiO_2$ content 7.5%) of water glass No. 3 (JIS K 140866) was passed through a column packed with an ion-exchange resin, Amberlite IRC50, which had been treated with 7% ammonia water and washed with water in advance, to afford a modified liquid silicic acid. In a high-speed mixer, 7 g of the modified liquid silicic acid adjusted to $SiO_2$ concentration of 7% and 50 g of an aqueous soluble starch solution were stirred and mixed. The resultant mixture was freeze dried and then heated in an atmosphere of helium at 1440° C. for four hours. Consequently, there was obtained silicon carbide powder having a particle diameter in the range of 0.2 to 0.3μ. The crystalline phase was composed of 87% of 3C and 13% of 2H.

EXAMPLE 9

Ten (10) g of an aqueous 0.3% non-ionic surfactant (made by Nippon Oils and Fats Co., and marketed under treatment designation of NS-230) solution was mixed with 1.8 g of carbon black and then with 30 g of an aqueous 6% silicic acid solution. While under thorough agitation, the mixture was neutralized to pH 7.1 by addition of an aqueous 2% ethylene diamine solution. The neutralized mixture was immediately filtered and the precipitate was separated.

By subjecting the precipitate to the reaction as in Example 1, there was obtained silicon carbide. The product had a particle diameter in the range of about 0.1 to 0.2μ. No $SiO_2$ was found in the product by X-ray diffractometry. The crystalline phase was composed of 82% of 3C and 18% of 2H.

EXAMPLE 10

A clear solution was obtained by mixing 21 g of an aqueous 9.5% silicic acid solution obtained by removing sodium from water glass No. 3 (JIS K1408-66) by use of an ion-exchange resin and 28 g of an aqueous 11% polyvinyl alcohol solution. This clear solution was freeze dried to afford a powder. One (1) g of this powder was heated in air at 200° C. for 10 hours and then heated in an atmosphere of argon at 1440° C. for four hours. The resultant product was lightly pulverized to afford silicon carbide powder having a particle diameter in the range of 0.3 to 0.5μ. The crystalline phase was composed of 82% of 3C and 18% of 2H.

EXAMPLE 11

The procedure of Example 10 was repeated, except that casein was used in the place of polyvinyl alcohol. Consequently, there was obtained silicon carbide powder having a particle diameter in the range of 0.3 to 0.6μ. The crystalline phase was composed of 78% of 3C and 22% of 2H.

EXAMPLE 12

A dilute solution obtained by adding 70 g of water to 103.5 g water glass No. 3 (JIS K1408-66) was added dropwise at 5° C. to 340 g of an aqueous 4.6% HCl solution to be neutralized. A 250-g portion of the resultant solution was thoroughly shaken with 100 ml of isopropyl alcohol and 70 g of NaCl. The mixture was left standing to permit separation of an isopropyl alcohol phase. This phase was treated with an ion-exchange resin, Amberlyst 15 (H+ form), to afford an isopropanol alcohol solution of silicic acid ($SiO_2$ content 8.8%).

Fourteen (14) ml of this solution was mixed with 15 ml of dimethyl formamide and the mixture was vacuum concentrated to a final volume of about 15 ml. The concentrated mixture was mixed with 9 g of a solution of 10% polyacrylonitrile in dimethyl formamide. The produced mixture was added dropwise to hexane, to afford a precipitate. The precipitate was separated and heated in an atmosphere of argon at 1440° C. for six hours. Consequently, there was obtained silicon carbide having a particle diameter in the range of 0.7 to 1μ. The crystalline phase was composed of 76% of 3C and 24% of 2H.

What is claimed is:

1. A method for the manufacture of a finely divided, high purity silicon carbide having a particle diameter of from 0.1 to 1.0μ and containing no $SiO_2$ as detected by X-ray diffractometry, which comprises subjecting a homogeneous mixture of a liquid silicic acid or a modified liquid silicic acid with carbon in the form of a powder or a precursor of carbon in the form of powder or a solution of heat treatment at a temperature of 1350° C. to 1850° C. in a non-oxidizing atmosphere.

2. A method according to claim 1, wherein the liquid silicic acid is a solution or sol of silicic acid obtained by neutralization of dealkalinization of an aqueous alkali silicate solution.

3. A method according to claim 1, wherein the liquid silicic acid is a solution or sol of silicic acid obtained by hydrolysis of a hydrolyzable silicon compound.

4. A method according to claim 1, wherein the carbon in the form of powder is a carbon black or an activated carbon.

5. A method according to claim 2, wherein the carbon in a powdered form is a carbon black or an activated carbon.

6. A method according to claim 1, wherein the precursor of carbon is a carbohydrate or a derivative thereof, a protein substance or a derivative thereof, a vinyl polymer or a derivative thereof, a thermosetting resin, or a petroleum pitch.

7. A method according to claim 2, wherein the precursor of carbon is a carbohydrate or a derivative thereof, a protein substance or a derivative thereof, a vinyl polymer or a derivative thereof, a thermosetting resin, or a petroleum pitch.

8. A method according to claim 1, wherein the precursor of carbon is a starch or a derivative or hydrolyzate thereof.

9. A method for the manufacture of a finely divided, high purity silicon carbide having a particle diameter of from 0.1 to 1.0μ and containing no $SiO_2$ as detected by X-ray diffractometry, which comprises forming a homogeneous mixture of a liquid silicic acid or a modified liquid silicic acid with carbon in the form of a powder or a precursor of carbon in the form of a powder or a solution, drying the mixture, and then heat-treating the dried mixture at a temperature of 1350° C. to 1850° C. in a non-oxidizing atmosphere.

* * * * *